3,279,912
TREATING MOLTEN METALS WITH MULTIPLE ELECTRIC ARC COLUMNS

Frank S. Death, Tonawanda, Walter B. Farnsworth, Jr., Amherst, and David A. Haid, Kenmore, N.Y., assignors to Union Carbide Corporation, a corporation of New York
No Drawing. Filed Oct. 2, 1962, Ser. No. 227,941
6 Claims. (Cl. 75—10)

The present invention relates to a process for efficiently treating molten metals with at least one treating electric arc column and one or more electric arc columns primarily used to maintain heat input into the molten metal bath. The latter arc columns are referred to hereinafter as heating arc columns.

In general in processes for treating molten metals with reactive gases it is desirable to maintain or raise the temperature of the bath as well as to present the gas to the bath in such a condition that it is readily reacted with and/or solubilized in the molten metal bath.

Recently several devices, commonly called arc torches, have been developed which are capable of establishing and maintaining directionally stable electric arc columns in electrical contact with metal baths. An example of an arc torch device capable of establishing such a directionally stable electric arc column is disclosed and claimed in U.S.P. 2,806,124, issued to Robert M. Gage on September 10, 1957, and U.S.P. 2,862,099, issued to Robert M. Gage on November 25, 1959. The electric arc columns issuing from such torches have several distinct characteristics: namely, the ability to remain directionally stable between a non-consumable electrode and a desired spot or restricted area on a molten metal bath even when the arc column is drawn out to considerable lengths; the ability to be drawn out to considerable lengths thereby increasing the electrical energy dissipated as heat energy at a given arc column current; they contain partially ionized gases which in addition to carrying current also transfer a large amount of heat energy to the molten metal bath; the partially ionized gas can be either a gas which is reactive with the molten metal bath or an inert gas; and, they are capable of being established and maintained in circuit with either A.C. or D.C. power sources.

Since reactive, refining or metal processing gases in general can be used as the partially ionized gas in the directionally stable electric arc columns as well as inert gases it was conceived that there now is available a device which can be used to supply heat to and maintain the temperature of a molten bath during refining or processing thereof while at the same time supply the reactive gas to the molten bath in such a condition that it is readily reacted with and/or solubilized in the molten metal bath, i.e. as in a very hot partailly ionized condition.

We have discovered in addition that as the directionally stable electric arc column increases in length, though there is a desirable increase in power input to the molten metal bath at constant current levels by the electric arc column, there is also a decrease in the efficiency at which the reactive gas in the electric arc column is utilized in processing of the metal bath. Concomitantly, as the electric arc column containing the partially ionized reactive or refining gas is decreased in length at constant current, the efficiency at which the reactive gas is utilized by the metal is significantly increased but there is also an undesirable decrease in the electrical energy dissipated as heat energy in the electric arc column due to the shortening thereof. Of course, the decrease in power input may be somewhat compensated for by increasing the current in the electric arc column but this leads to excess wear on the electrodes of the arc torch device as well as requires the use of a more expensive high powered electrical power supply equipment.

It is an object of the present invention to provide a process wherein an electric arc column is operated at the optimum arc length required for maximum efficiency in relation to the use of reactive or refining gases to treat the molten metal without sacrificing the power input to the molten metal bath.

It is another object to provide a process wherein the treating electric arc column is operated at a length commensurate with maximum reactive gas efficiency while fully utilizing the power available from a single electrical power supply.

The process achieving the aforementioned objects comprises establishing, at a given optimum current level and a given desirable power level, in electrical circuit with a single power supply, at least one heating electric arc column and at least one treating electric arc column, the electric arc columns being essentially directionally stable electric arc columns containing partially ionized gas and the treating arc column essentially containing at least one partially ionizied metal refining gas; and reducing the length of the treating arc column to maintain efficient utilization of the refining gas in treating the molten metal while concurrently increasing the length of the heating arc column to substantially maintain the given desired power level at the given optimum current level for the given single power supply.

The term "treating electric arc column" is defined herein to denote the arc column containing the reactive, refining or metal processing gas, and in which column an artisan desires to achieve maximum efficiency in utilization of such refining, reactive or processing gas. It is this column in which is contained the partially ionized refining gas which an artisan seeks to efficiently utilize in treating the molten metal bath by the shortening thereof. The reactive, refining or processing gases include hydrogen, nitrogen, carbon monoxide, carbon dioxide, methane, oxygen, natural gas, chlorine and hydrocarbon gases in general.

The phrase "heating electric arc column" is defined herein to denote the electric arc column which the artisan is lengthening primarily for the purpose of maximizing the power input to the molten metal bath for a given optimum level of current available from a given single power supply by the lengthening thereof. In this manner the power supply is operating in the system of furnace circuit near its optimum power level at the particular optimum current rating for the selected single power supply.

The partially ionized gases utilized in the heating arc column may be any one selected from the group consisting of the inert gases such as argon, helium, neon, xenon or krypton as well as the so-called reactive gases such as hydrogen, oxygen, carbon monoxide, carbon dioxide, nitrogen, chlorine, methane, air, natural gas or other hydrocarbon gases in general.

The partially ionized gases utilized in the treating arc column must be at least one of the reactive, refining or processing gases such as hydrogen, nitrogen, carbon monoxide, carbon dioxide, chlorine, methane, air natural gas and other hydrocarbon gases, alone or in admixture with at least one of the aforementioned inert gases.

In some instances an artisan may employ a reactive gas in both the heating arc column and the treating arc column but of course, the reactive gas employed in each column would not likely be of the same species. This is generally the case since the advantage gained by optimizing reactive gas treating efficiency in the treating arc column would be lost by the inefficient utilization of the same reactive gas in the heating arc column.

There are many instances in which one species of gas, though generally categorized above as a reactive gas would not be considered as highly reactive at a certain temperature level and/or in treatment of a certain type of molten bath while a different species of gas generally categorized as a reactive gas above, would be considered highly reactive with the same bath under the same specific conditions of the given process. In these instances an artisan may wish to utilize different species of the above categorized reaction gas simultaneously but utilizing the species which is not highly reactive under the particular conditions in the heating arc column merely to aid in supplying heat to the bath while maximizing the efficiency of utilization of the other highly reactive species in the treating arc column.

In iron and steel refining, for example, nitrogen could be considered as a reactive gas since it has appreciable solubility in the liquid metal, and its presence in the solid affects the mechanical and physical properties markedly. Generally, therefore, nitrogen could not be used as the heating gas if close nitrogen control of the solidified steel were desired. However, in other metal systems, for example, liquid copper or aluminum, nitrogen has a very limited or immeasurable solubility. In these systems, nitrogen could well be used as the heating gas since it is essentially inert to the molten metal.

Other examples would be the hydrocarbon gases. Carbon is an important alloying element in steels. Passing hydrocarbon gases through arc torch plasmas can result in appreciable absorption of carbon into the melt. In some metal systems, such as copper, carbon is not soluble, and the hydrocarbon gas might be useful as a heating gas.

The single power supply used in the present process may be D.C., single-phase A.C. or three-phase A.C.

When a D.C. power supply is used, only two electric arc columns are established in circuit with the single power supply; one of the electric arc columns will be running at straight polarity, i.e. the current flow in the arc column will be from the non-consumable electrode of the arc torch to the molten metal bath, and the other arc column will be running at reverse polarity, i.e. the current flow in the column will be from the bath to the non-consumable electrode of the arc torch.

When the power supply is a single phase A.C. power supply again only two arc columns are employed. Of course, here each arc column is intermittently running first at straight polarity then at reverse polarity but each arc column is always running at a polarity which is the reverse of the polarity of the other arc column.

When a three-phase A.C. power supply is utilized an artisan may employ two arc torches with a solid electrode contacting the bath or an artisan may employ three arc torches with no additional electrodes required.

Though the discussion above has been directed to the correlation of the number and type of electric arc columns (i.e. treating or heating) with a single power supply (e.g. either A.C. or D.C.) and indeed thought one of the primary advantages of the present process is the ability to optimize the heat energy available from a single power supply, it should be noted that the present process includes the use of a plurality of power supplies each power supply being in a separate electrical circuit with the required number of electric arc columns and/or solid electrodes as specified above.

The discussion herein above has also been largely limited to the refining process period. The present process is also readily amenable for use after a melting period employing a plurality of electric arc columns connected in circuit with a single power supply. That is, melt down may be fully or partially accomplished with two or more heating arc columns running at optimum power on current levels for a given power supply and then a reactive gas may be introduced into one of the electric arc columns to convert the same to a treating arc column. Thereafter the present process may be employed to maximize the utilization of the reactive gas in treating the molten metal while maintaining the optimum power and current level of the same power supply.

A specific embodiment of a meltdown and refining cycle conducted in accordance with the present invention comprises charging a furnace with metallic materials and initiating a plurality of directionally stable electric arc columns and contacting the metallic charge materials therewith. The number, type and circuitry of the arc producing torch apparatus would conform to anyone of the aforementioned arrangements. During meltdown, if no refining is desired the arc columns could be of any desired length commensurate with the desired power input level and the capacity of a given power supply. At the start of the refining period reactive gas is added to one arc column, thereby making it the treating arc column and the length of this arc column is decreased to achieve optimum reactive gas utilization. At the same time the length of the heating arc column is increased, thereby maintaining a high power input to the molten metal bath.

While the foregoing discussion describes the present invention with some particularity, it is contemplated that minor modifications may be made without departing from the spirit and scope of the present invention.

What is claimed is:

1. A metallurgical process comprising establishing at a given optimum current level and a desired power level, in electrical circuit with a power supply at least one heating electric arc column and at least one treating electric arc column, said electric arc columns being essentially directionally stable electric arc columns containing partially ionized gas and said treating electric arc column essentially containing at least one partially ionized metal refining gas; reducing the length of the treating arc column to effect efficient utilization of said refining gas in treating said molten metal while concurrently increasing the length of said heating arc column to substantially maintain said desired power level at said given optimum current level.

2. A process in accordance with claim 1 wherein said power source is a single D.C. power source and one heating electric arc column and one treating electric arc column are established in electrical contact with said molten metal bath, the current flow in said heating arc column essentially be opposite in direction to the current flow in said treating arc column.

3. A process in accordance with claim 1 wherein said power supply is a single, A.C. single phase power supply and one heating electric arc column and one treating electric arc column are established in electrical contact with said molten metal bath, the current flow in each of said electric arc columns intermittently alternating in direction and the current flow in the electric arc columns instantaneously being in opposite directions.

4. A process in accordance with claim 1 wherein said electrical power supply is a single three phase A.C. power supply, the total number of electric arc columns established and contacting said molten metal is three and at least one of said total number of electric arc columns is a treating electric arc column.

5. A process in accordance with claim 1 wherein said electrical power supply is a single three phase power supply, the total number of electric arc columns established is two, one of said electric arc columns being a treating electric arc column and a solid electrode contacting said molten metal bath is connected in electrical circuit with said single power supply and said electric arc columns.

6. A metallurgical process comprising establishing at a given optimum current level and at a desired power level, in electrical circuit with a single power supply at least one heating electric arc column and at least one treating electric arc column said electric arc columns being essentially directionally stable electric arc columns containing at least one partially ionized gas and said treating electric arc column containing at least one partially ionized gas selected from the group consisting of oxygen, carbon dioxide, carbon monoxide, chlorine, nitrogen, methane, natural gas and hydrogen; reducing the length of the treating arc column to effect efficient utilization of said selected partially ionized gas in treating said molten metal while concurrently increasing the length of said heating arc column to substantially maintain said desired power level at said given optimum current level.

References Cited by the Examiner

UNITED STATES PATENTS

| | | |
|---|---|---|
| 2,744,945 | 5/1956 | Johnson. |
| 2,909,422 | 10/1959 | Schwabe _____ 75—10 |
| 3,147,330 | 9/1964 | Gage _____ 13—34 X |

DAVID L. RECK, *Primary Examiner.*

WINSTON A. DOUGLAS, H. F. SAITO,
*Assistant Examiners.*